United States Patent [19]

Harlow

[11] Patent Number: 4,658,954

[45] Date of Patent: Apr. 21, 1987

[54] CONVEYOR FOR ROLLABLE ARTICLES

[75] Inventor: Raymond P. Harlow, Westland, Mich.

[73] Assignee: Centri-Spray Corporation, Livonia, Mich.

[21] Appl. No.: 771,006

[22] Filed: Aug. 30, 1985

[51] Int. Cl.$^4$ ............................................. B65G 25/00
[52] U.S. Cl. ..................................... 198/774; 414/748
[58] Field of Search ...................... 198/774, 468.4, 751, 198/460, 775; 414/745, 748

[56] References Cited

U.S. PATENT DOCUMENTS 3,623,600 11/1971 Dell ................................ 198/774 X
4,321,995  3/1982 Dell et al. ....................... 198/774 X

FOREIGN PATENT DOCUMENTS 2847366  7/1979 Fed. Rep. of Germany ...... 198/774
139804   1/1980 German Democratic Rep. ..................................... 198/774
188220  11/1983 Japan ................................... 198/774
960098   9/1982 U.S.S.R. .............................. 198/774

Primary Examiner—Joseph E. Valenza
Assistant Examiner—D. Glenn Dayoan
Attorney, Agent, or Firm—Joseph W. Farley

[57] ABSTRACT

A conveyor having a pair of fixed, transversely spaced side rails adapted to support a plurality of rollable articles for forwarding movement to successive positions each defined by a pair of vertical abutments having a pair of ramps extending forwardly and downwardly from their upper ends to the next successive position. A pair of transversely spaced, upwardly and downwardly movable article advancing members, having pairs of downwardly inclined article advancing surfaces and upwardly inclined article retarding surfaces between each successive position, is adapted on upward movement to raise an article above the abutments of one position, to cause forward rolling movement thereof on the advancing surfaces to a location above the next pair of ramps, and on downward movement to deposit the article on those ramps for rolling movement to the next position, the rate of that movement being controlled by the article retarding surfaces.

2 Claims, 3 Drawing Figures

CONVEYOR FOR ROLLABLE ARTICLES

SUMMARY OF THE INVENTION

This invention relates to improvements in a conveyor of the type having a plurality of article-supporting positions to which articles are forwarded successively by raising the articles and depositing them on forwardly and downwardly inclined pairs of ramps leading to the next successive position, each article having a cylindrical surface or surfaces rollingly engageable with the pair of the ramps.

In prior conveyors of this type, as illustrated by U.S. Pat. No. 3,623,600, the pairs of ramps are provided on a pair of fixed, transversely spaced side members having a pair of generally vertically upwardly extending abutments defining each of the successive article positions on the conveyor, each pair of ramps extending forwardly and downwardly from the upper portions of the pair of abutments of one article position to the lower portions of the pairs of abutments at the next successive position. A pair of upwardly and downwardly reciprocatable article advancing member is disposed intermediate the pair of side members and is provided with pairs of forwardly and downwardly inclined surfaces adapted, on upward and downward movement of the article advancing members, to raise articles above the abutments and deposit them on the ramps. The raised articles roll forwardly to the abutments of the next successive position first on the downwardly inclined surfaces of the article advancing members and then on the downwardly inclined ramps of the fixed side members. The forward rolling movements of the articles can result in one or more of them assuming a skewed position such as to cause a malfunction of the conveyor.

The conveyor of the present invention comprises a similar pair of fixed transversely spaced side members adapted to support a plurality of articles for movement in a forwarding direction longitudinally of the side members between a plurality of successive positions each defined by a pair of vertically upwardly extending abutments. A pair of downwardly inclined ramps extends forwardly from the upper portions of the pair of abutments of one position to the lower portions of the pair of abutments of the next successive position. A pair of transversely spaced upwardly and downwardly reciprocatable article advancing members disposed intermediate the side members is adapted to raise aritles above the abutments and deposit the raised articles on the ramps for gravity-urged rolling movement thereon to the abutments of the successive positions. The article advancing members are provided between each successive position with a pair of forwardly and downwardly inclined article advancing surfaces followed by a pair of forwardly and upwardly inclined article retarding surfaces. Each pair of article advancing surfaces is adapted in response to upward movement of the article advancing members to raise an article above a pair of the abutments and cause forward rolling movement of such article to a location above the pair of ramps which extend forwardly from such pair of abutments. Each pair of article retarding surfaces is adpated, in response to downward movement of the article advancing members, to control the rate of forward rolling movement of such article along the pair of ramps. This control of forward rolling movement prevents skewing of the article and reduces the possibility of damage to them.

Preferably, an article locating depression is provided on the article advancing members between each article advancing surface and each article retarding surface. These depressions limit the extent of forward rolling movement of an article on a pair of article advancing surfaces, prevent backward rolling movement from being imparted to the article by the article retarding surfaces, and define the location at which the article is deposited on a pair of the ramps. This location is adjacent to the upstream or rearward end of the pair of ramps so that article movement on the pair of ramps is controlled over almost their entire length by the article retarding surfaces.

At the forward end of each article retarding surface the article advancing members are provided with a vertical surface which extends downwardly to the next article advancing surface and which is spaced rearwardly from an article engaging the abutments of the next successive article position. This vertical surface is transversely adjacent to the upstream end of a pocket provided in the fixed side members at the forward end of each of the ramps, the pockets being adapted to retain and correctly position an article in engagement with the abutments of the next successive article position.

Other features and advantages of the invention will be apparent from the description to follow of the embodiemnt thereof disclosed in the accompanying drawings.

DESCRIPTION OF THE PREFERRED EMBODIMENT

Figure 1:
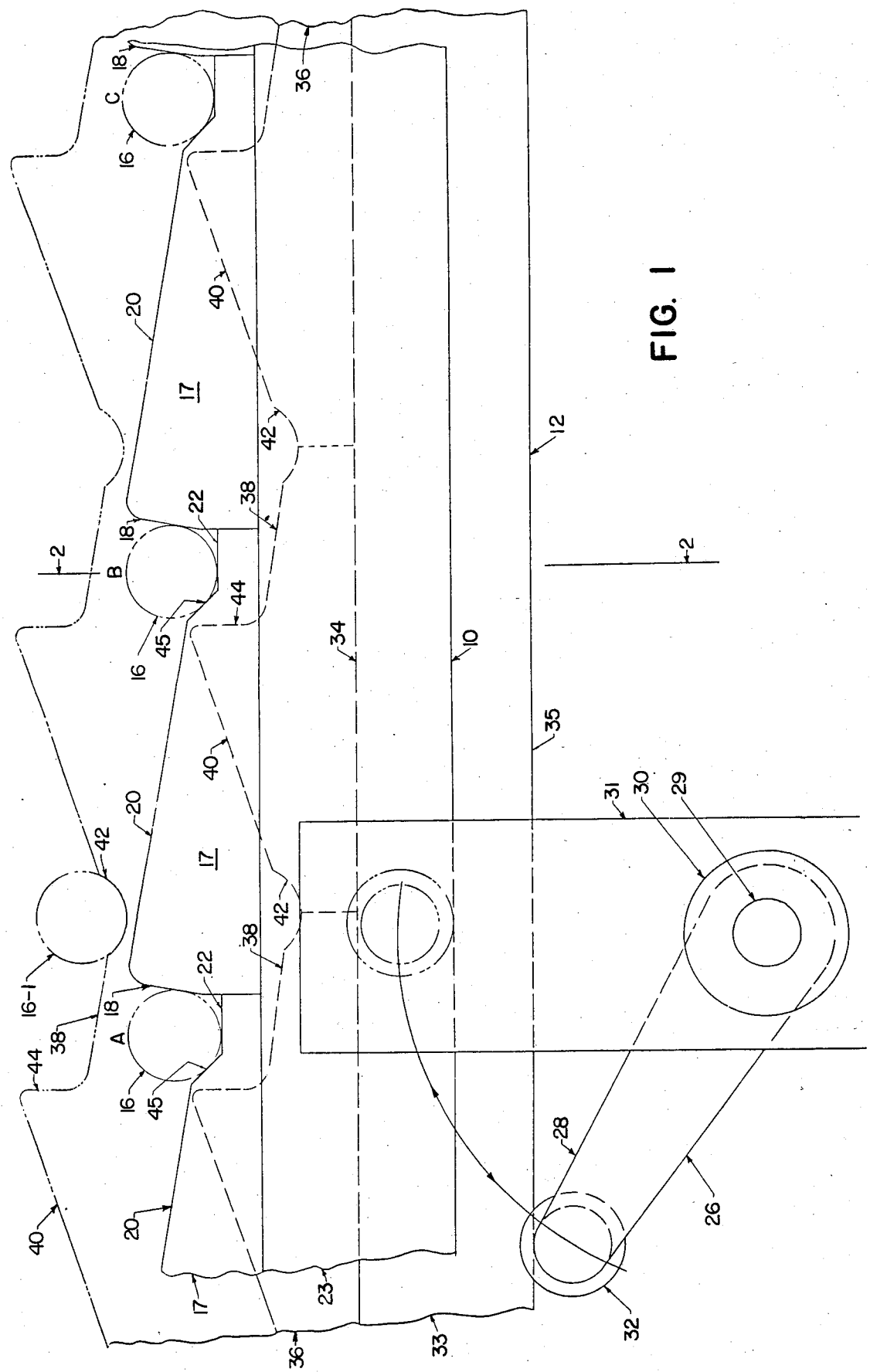
FIG. 1 is a fragmentary side elevation of a portion of a conveyor of the invention and includes a broken line showing of the article advancing members in their upper position.
Figure 2:
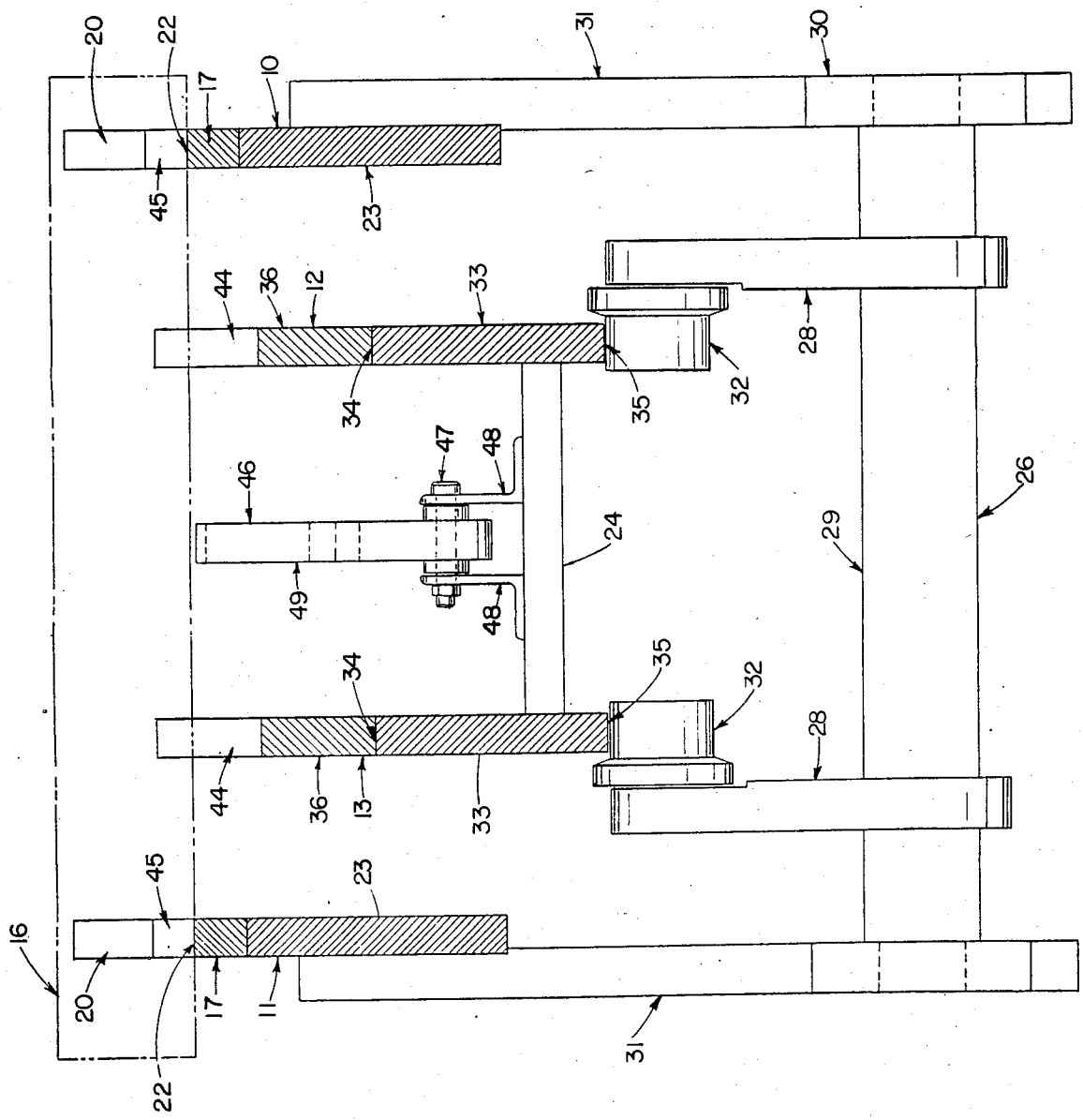
FIG. 2 is a transverse sectional elevation of the conveyor, taken as indicated by the line 2—2 of FIG. 1.
Figure 3:
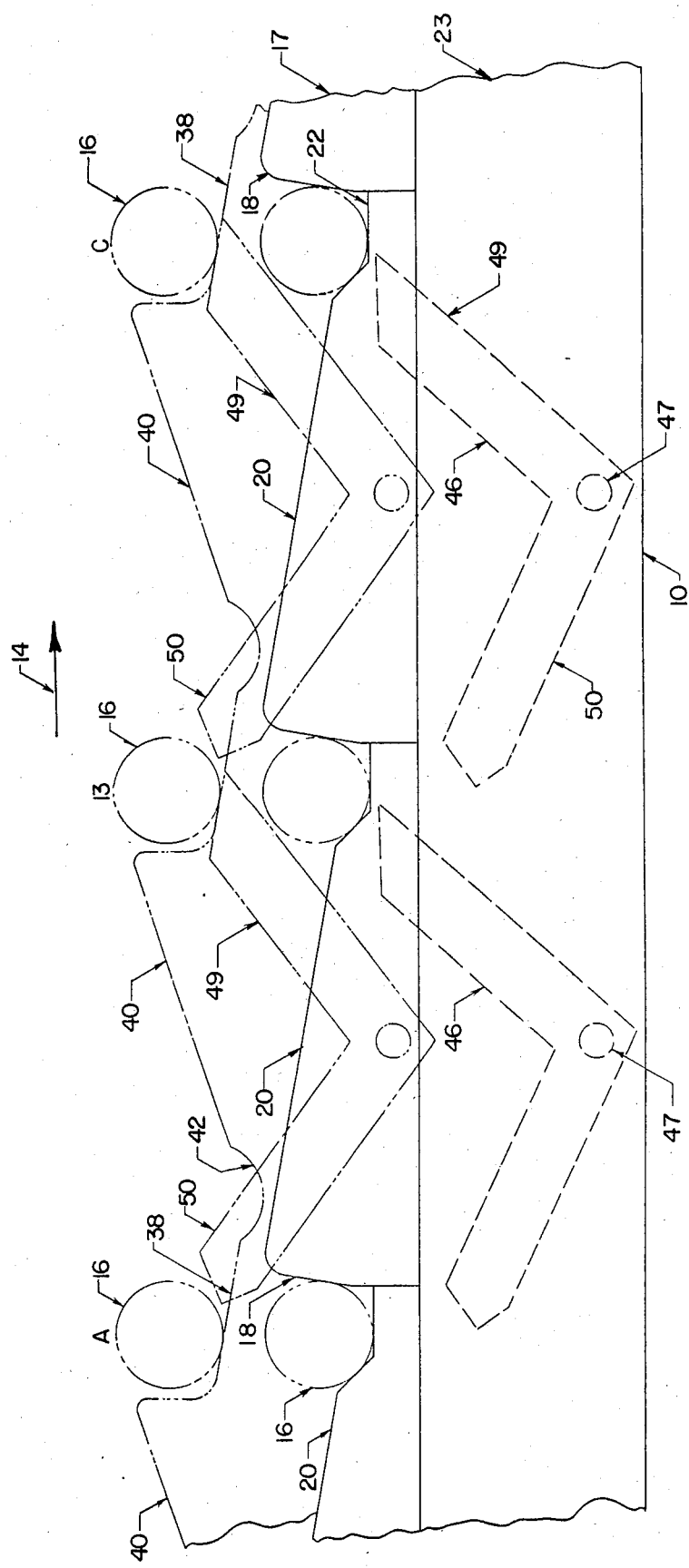
FIG. 3 is a side elevation similar to FIG. 1 but adding a schematic illustration of the operation of latch members provided for controlling the advancing movement of articles.

For purposes of clarity, FIGS. 1-3 illustrate only the principal components of a conveyor of the invention in sufficient detail to enable the construction and operation thereof to be apparent to one skilled in the art. These components include a pair of fixed, transversely spaced side members 10 and 11; and a pair of upwardly and downwardly reciprocatable article advancing members 12 and 13 disposed intermediate the side members 10 and 11 as shown in FIG. 2.

The side members 10 and 11 are carried by a suitable frame structure (not shown) and are adapted to support a plurality of articles 16 for movement in a forward direction indicated by the arrow 14 between a plurality of successive positions or stations A, B and C. Each of the articles 16 has cylindrical surfaces (for example, the main bearings of a crankshaft) engageable by both the side members 10 and 11 and by the article advancing members 12 and 13 for rolling movement thereon. The upper portion of each of the side members 10 and 11 is formed by a series of parts 17 which provide the side members with article supporting surfaces having a pair of generally vertically extending abutments 18 defining each of the positions A, B and C, a pair of downwardly inclined ramps 20 extending forwardly from the upper portions of the pair of abutments 18 of one position to the lower portions of the pair of abutments 18 of the next successive position, and pockets 22 at the forward ends of each pair of ramps adapted to retain an article in engagement with the abutments 18 of the next successive position.

Each of the parts 17 is secured to the upper edge of a base portion 23 of each one of the side members 10 and 11 in any suitable manner, and defines the longitudinal spacing between the successive stations A, B and C. A part 17 is provided on each side member for each additional station that may be desired for a particular conveyor. However, the last, or discharge station of the conveyor may merely have a pair of the abutments 18 defined by a part of different configuration than the part 17, since ramps 20 may not be required at the discharge station depending upon the unloading mechanism employed.

The article advancing members 12 and 13 are connected together by a plurality of transverse members 24 (FIG. 2). Upward and downward reciprocating movements are imparted to the interconnected members 12 and 13 by any suitable means such as the mechanism 26 partially shown in FIGS. 1 and 2. This mechanism 26 includes a pair of crank arms 28 connected to a transverse shaft 29 supported by bearings 30 mounted in frame members 31 and carrying rollers 32 on which the article advancing members 12 and 13 rest. Unillustrated components of the mechanism 26 would include a second, longitudinally spaced set of the elements 28 through 32; means such as a fluid pressure cylinder and crank for oscillating one of the shafts 29; means connecting the shafts 29 for movement in unison; and suitable guide means for defining the upward and downward movements of the article advancing members 12 and 13.

Each of the article advancing members 12 and 13 is formed by a base member 33 having parallel upper and lower edges 34 and 35, and by a series of parts 36 which are mounted on the upper edge 34 and which provide the members 12 and 13 with article engaging surfaces. Between each of the successive positions A, B and C, etc. these surfaces comprise a pair of article advancing surfaces 38, a pair of article retarding surfaces 40, and an article locating depression 42 between each of the article advancing surfaces 38 and article retarding surfaces 40. A vertical surface 44, provided on each of the parts 36 at the forward end of each of the article retarding surfaces 40, extends downwardly to the next article advancing surface 38 and is spaced rearwardly from an article engaging the abutments 18 of the next successive position, as shown in FIG. 1.

It can also be seen from FIG. 1 that in response to upward movement of the article advancing members 12 and 13 to their broken line position, each pair of article advancing surfaces 38 is adapted to raise an article 16 above the abutments 18 of one position (e.g. position A) and to cause forward rolling movement of the article to a location (illustrated by the article 16-1 and defined by a pair of the depressions 42) above the pair of ramps 20 extending to the next successive position. Ensuing downward movement of the article advancing members 12 and 13 deposits the article 16 on the ramps 20, and during that downward movement each pair of article retarding surfaces 40 is adapted to control the rate of forward rolling movement of an article along the pair of ramps on which it is deposited. Mispositioning or skewing of the article is thereby prevented, the possibility of damage to the article or to the conveyor from an excessive rate of article movement is reduced, and the overall operability of the conveyor is increased.

Contributing to these results are the features that the pairs of article locating depressions 42 are each arranged transversely adjacent to the rearward portion of a pair of the ramps 20 to provide a maximum extent of control over the rolling forward movement of articles on the ramps; that the pockets 22 each includes an anti-back-up surface 45 adapted to retain an article in engagement with an abutment 18; and that an article so retained by a pair of the pockets 22 is engageable only by a pair of the article advancing surfaces 38 of the article advancing members on the upward movement thereof, the article retarding surfaces 40 being terminated by the vertical surfaces 44 spaced rearwardly from an article so retained by the pockets 22.

Conveyors of the present type have conventionally been provided with devices adapted to control advancing movement between successive positions or stations of the conveyor and to prevent such advancing movement of an article if the next successive article cannot also advance. Such devices can be incorporated in the present conveyor and consist of a series of latches 46 provided on the article advancing members, as shown in FIGS. 2 and 3.

Each latch 46 is mounted longitudinally intermediate successive pairs of article advancing surfaces 38 on a pivot 47 carried by brackets 48 secured to one of the transverse members 24 interconnecting the article advancing members 12 and 13; and each latch 46 has a forwardly extending arm 49 and a rearwardly extending arm 50 which biases the latch 46 to the dash-line position shown in FIG. 3 occupied by all of the latches 46 when the article advancing members 12 and 13 are in their lower position. Upon upward movement of the article advancing members 12 and 13, the rearwardly extending arm 50 of each latch 46 is positionable in the path of forward movement of an article 16 on the rearward one of the successive pairs of article advancing surfaces 38 in response to engagement of the forwardly extending arm 49 of that latch 46 with an article on the forward one of the successive pairs of article advancing surfaces. If the forward one of the articles at successive positions cannot advance—for example, it is at the last or discharge position on the conveyor and is not removed therefrom—each article at successive upstream positions on the conveyor is prevented from advancing by the latches 46; only articles that are upstream from an empty position are permitted to advance.

The particular configurations of the parts 17 and 36 shown herein are of course variable to suit the characteristics of the articles to be conveyed, as also is the relative transverse placement of the side members 10 and 11 and the article advancing members 12 and 13.

What is claimed is:

1. In a conveyor comprising a pair of fixed transversely spaced side members adapted to support a plurality of articles for movement in a forwarding direction longitudinally of said side members between a plurality of successive positions, said pair of side members having longitudinally spaced transversely aligned pairs of vertically extending abutments defining said successive positions and longitudinally spaced transversely aligned pairs of downwardly inclined ramps, each pair of ramps extending forwardly from the upper portions of the pair of abutments of one position to the lower portions of the pair of abutments of the next successive position; and a pair of transversely spaced upwardly and downwardly reciprocatable article advancing members disposed intermediate said side members, said article advancing members being adapted to raise articles above said abutments and deposit the raised articles on said inclined ramps for gravity-urged movement thereon in said forwarding direction to the abutments of the successive positions, the improvement wherein:

said pair of article advancing members is provided between each of said successive positions with transversely aligned pairs of surfaces comprising a pair of forwardly and downwardly inclined article advancing surfaces, a pair of forwardly and upwardly inclined article retarding surfaces, a pair of article locating depressions between said article advancing and article retarding surfaces, and a pair of vertical surfaces extending downwardly from the forward ends of the pair of article retarding surfaces to the rearward ends of the next successive pair of article advancing surfaces; said pair of article locating depressions being positioned transversely adjacent to the rearward portion of one of said pairs of ramps and said pair of article retarding surfaces extending forwardly from said pair of article locating depressions substantially coextensively with said one pair of ramps; said pair of article advancing surfaces being adapted in response to upward movement of said article advancing members to raise an article above the pair of abutments at the rear of said one pair of ramps and to cause forward movement of such article to said pair of article locating depressions; and said pair of article retarding surfaces being adapted in response to downward movement of said article advancing members to control the rate of forward movement of such article along the extent of said one pair of ramps to the next successive pair of abutments.

2. A conveyor according to claim 1 wherein said side members are provided at the forward end of each pair of ramps with a transversely aligned pair of pockets adapted to retain an article in engagement with the pair of abutments of the next successive position, and each pair of vertical surfaces of said article advancing members is located rearwardly of and adjacent to an article retained by a pair of pockets.

* * * * *